United States Patent [19]

Baxter et al.

[11] 4,218,709
[45] Aug. 19, 1980

[54] VIDEO SWITCHING SYSTEM

[75] Inventors: Larry K. Baxter, Lexington; A. Donald Brickman, Andover, both of Mass.

[73] Assignee: Echolabs, Inc., Burlington, Mass.

[21] Appl. No.: 839,664

[22] Filed: Oct. 5, 1977

[51] Int. Cl.² .............................................. H04N 5/22
[52] U.S. Cl. .................................................. 358/181
[58] Field of Search .............................. 358/181–183, 358/22, 185

[56] References Cited

U.S. PATENT DOCUMENTS

| 2,723,307 | 11/1955 | Baracket et al. ................. 358/182 X |
| 3,506,965 | 4/1970 | Dowling et al. ................. 358/181 X |
| 3,627,914 | 12/1971 | Davies et al. .......................... 358/183 |
| 4,028,727 | 6/1977 | Skrydstrup ........................... 358/181 |
| 4,086,619 | 4/1978 | Miyake et al. ....................... 358/183 |
| 4,101,930 | 7/1978 | Sanders et al. ....................... 358/183 |

OTHER PUBLICATIONS

"TV Video Switching", Brush, Television Engineering, Jul. 1951, pp. 12–29.

Primary Examiner—Robert L. Griffin
Assistant Examiner—Aristotelis M. Psitos
Attorney, Agent, or Firm—Cesari & McKenna

[57] ABSTRACT

A video switching system particularly adapted for use in a small studio environment includes a group of independent selection switches that enables a user to select any one of a plurality of different input video signals and route that signal to a preview output for display on a preview monitor. When it is desired to switch the previewed signal to a program output for actual broadcasting, the user activates a take switch. The system, however, does not abruptly switch the previewed signal to the program output, but rather automatically generates a mixture of the previewed signal and old program signal and automatically adjusts the mixture so that the old program signal is uniformly faded out and the previewed signal is uniformly faded into the program scene. The effect of the transition to the previewed signal is thereby automatically softened. The rate at which the transition takes place is broadly adjustable and may be selected so that it is accomplished in a period of time anywhere from that corresponding to a few video frames up to that corresponding to several hundred video frames. When the previewed signal is completely faded into the program scene, the system invisibly switches the previewed signal directly to the program output, thereby automatically enabling the user to select other video signals for previewing in preparation for future program changes. The system is such that a particular input signal can be switched to the program only if that signal is first selected for previewing by activation of one of the preview selection switches. The user is thereby forced to preview all scenes prior to presenting them to the program.

20 Claims, 5 Drawing Figures

VIDEO SWITCHING SYSTEM

BACKGROUND OF THE INVENTION

This invention relates generally to video switching systems and, more particularly, to a video switching system adapted for use in a studio or program control room of a television broadcasting or recording station.

It is customary in the television broadcast and recording field to employ a plurality of separate pick-up cameras which view a scene to be televised or recorded from different angles or which view different scenes to be televised or recorded simultaneously as a composite picture. The cameras generate video signals corresponding to the respective scenes being viewed and these signals are typically routed to a video switching system which enables a program director to select the scenes to be presented for broadcasting or recording during the course of the program. Most such video switching systems also incorporate some sort of special effects generator which allows the program director to combine two or more video scenes in a variety of ways and to present the combined scenes to program to produce a variety of pleasing and interesting visual effects. Typical of the special effects generated by such systems are what are commonly referred to as effects and mixes. Effects allow the program director to split the screen, place inserts of various shapes and sizes therein, and generally wipe from one scene to another. Mixes allow the director to combine scenes so that both are visible on the same portion of the viewer's screen for a period of time and to fade a first scene out of while fading a second, new scene into the screen.

Many of the more elaborate and expensive studios include a separate television monitor for each camera being used as well as for the actual program so that the program director can continuously view each scene and make decisions as to which of the scenes require adjustment or editing and which are best suited for presentation to program. However, for reasons of economy and convenience, many studios, particularly smaller studios, are now equipped only with a single television monitor for previewing purposes. The video switching systems used in such studios generally include a set of controls that enable the individual selection of the scene or combination of scenes to be displayed on the preview monitor for inspection and a corresponding set of controls that enable the individual selection of the scenes for programming.

In a typical prior art video switching system of the above-described type, the preview selection controls are in the form of a group of switches, in most cases of the pushbutton variety and arranged in a row, with a separate such switch for each camera or other video signal source and perhaps additional such switches for initiating the preview of scene combinations (i.e., effects and mixes). The program selection controls take the form of an identical row and number of switches, positioned near, and usually directly beneath, the corresponding preview switches.

By depressing the switch in the preview group corresponding to a particular camera, the program director can have the scene being viewed by that camera displayed on the preview monitor for his inspection. If it is determined that the previewed scene is suitable for programming, the director depresses the corresponding switch in the program group and the program scene changes accordingly.

Prior video switching systems of the above type have some recognized drawbacks. For example, because there is a separate switch for each camera in the program selection group, it is readily possible for the program director to select any scene for broadcasting without first previewing that scene. This presents the possibility that scenes that are undesirable for one reason or another will be switched directly to program, whether inadvertently or in an effort to save time, without the benefit of editing or adjustment by the director.

Another drawback of prior video switching systems of the above type relates to the manner in which program changes take place. Specifically, when a program change is initiated by the depression of a program selection switch, the scene displayed on program switches abruptly and discontinuously from the old scene to the new scene. The abrupt switching from one scene to another under many circumstances gives an unpleasant and disagreeable impression to the program viewer. Additionally, it is desirable in some situations to fade the old scene out of the picture while the new scene is faded into the picture so as to give the impression of a gradual transition. In order for this to be accomplished with prior video switching apparatus, the program director must first generate a mix of the old and the new scenes, adjust the mix so that the old scene predominates, switch the mix to the program, then gradually adjust the mix so that the old scene is faded out and the new scene is faded in. To achieve this gradual changeover, the director must typically operate a pair of manual controls that selectively attenuate the video signals corresponding to the two scenes. The rate of the transition from one scene to the other is dependent upon the rate at which the controls are manipulated by the operator. Thus, it is extremely difficult to effect the transition at a uniform rate. Additionally, after the transition between the scenes is completed, the program monitor will display only the new scene even though the signal being presented to program is actually a mixture of the old and the new scene. The program director can easily forget that the mixture is present and, by moving the mix controls, inadvertently re-introduce the old scene into the program. To avoid this, the director must switch the program from the mixture and to the new scene alone prior to preparing for future program changes.

It is, therefore, a broad object of this invention to provide an improved video switching system.

Another object of the invention is to provide an improved video switching system that is particularly adapted for use in a small studio environment that includes only a single preview monitor and a single program monitor.

Another object of the invention is to provide an improved video switching system of the type described that is adapted to force a program director to preview each video scene on a preview monitor prior to selecting that scene for program.

Another object of the invention is to provide an improved video switching system that, after the initiation of a program change, automatically fades the old scene out and the new scene into the program without the need for first establishing a mix between the scenes and without the need for manipulating any manual controls.

Another object of the invention is to provide an improved video switching system of the type described in which the rate at which the transition from the old scene to new scene takes place can be selected anywhere within a relatively wide range of rates prior to initiating the change.

Still another object of the invention is to provide an improved video switching system of the type described that upon completing the transition from the old scene to new scene, automatically, abruptly and essentially invisibly switches the new scene alone to program so as to avoid the inadvertent re-introduction of the old scene into the program.

SUMMARY OF THE INVENTION

In accordance with the invention, a video switching system includes a plurality of inputs for receiving a plurality of video signals from a corresponding plurality of separate video signal sources such as pick-up cameras, a preview output adapted for connection to a preview monitor which enables a user to view the video scene corresponding to a selected input signal, and a program output adapted for connection to television broadcasting or recording apparatus and also to a program monitor which enables the user to view the video scene actually being televised. The system also includes a preview array or group of switches which includes at least one switch for each separate input. Activating a switch in preview group corresponding to a particular input causes that input to be routed to the preview output and the corresponding video scene to be displayed on the preview monitor. A single program or take switch is included which, when activated, causes the input previously routed to the preview output also to be routed to the program output for actual programming and viewing on the program monitor. The system is arranged such that a particular video scene can be selected for programming by activation of the take switch only by first selecting that scene for previewing by activation of the appropriate preview switch. This arrangement forces the user to preview all scenes prior to presenting them to program and avoids the inadvertent presentation of undesirable, unedited or misadjusted scenes.

In accordance with another feature of the invention, activation of the take switch does not cause the input being previewed to be directly and abruptly routed to the program output of the system but rather to a take control unit which automatically controls the transtion. More specifically, the take control unit, in response to the activation of the take switch, uniformly decreases the level of the old video signal being routed to the program output and uniformly increases the level of the new video signal being routed to the program output so that, in the actual program, there is a uniform transition between the old and the new video scene. The rate at which the transition between the old and new scene takes place is broadly adjustable and may be set prior to the activation of the take switch. With the appropriate setting, for example, the transition may be accomplished in a period of time anywhere from that corresponding to a few video frames up to that corresponding to several hundred video frames. There is no need for the user to manipulate any controls in order to advance the transition. If, however, it is desired to control the transition or to freeze it at some point short of completion, the take control unit can be switched to a manual mode of control in which the transition proceeds only during the time period in which the user maintains the take switch in an activated position. When and only when the transition is complete and the level of the new input signal at the program output reaches its maximum, the new input signal alone is automatically switched directly to the program output. As a result, even if the transition rate selected is relatively fast, the effect of the transition on the program viewer is softened and generally more pleasing to the eye. Additionally, because at the end of the transition the new input signal is automatically switched directly to the program output, the system is automatically readied for future program changes.

BRIEF DESCRIPTION OF THE DRAWING

The foregoing and other objects, features and advantages of the invention will be better understood from the following detailed description taken in conjunction with the accompanying drawing in which:

FIG. 4, comprising FIGS. 4A through 4F, is a graphic waveform representation showing the relationship among various control signals generated by the take control unit of FIG. 3.

DETAILED DESCRIPTION OF ILLUSTRATIVE EMBODIMENT

Figure 1:
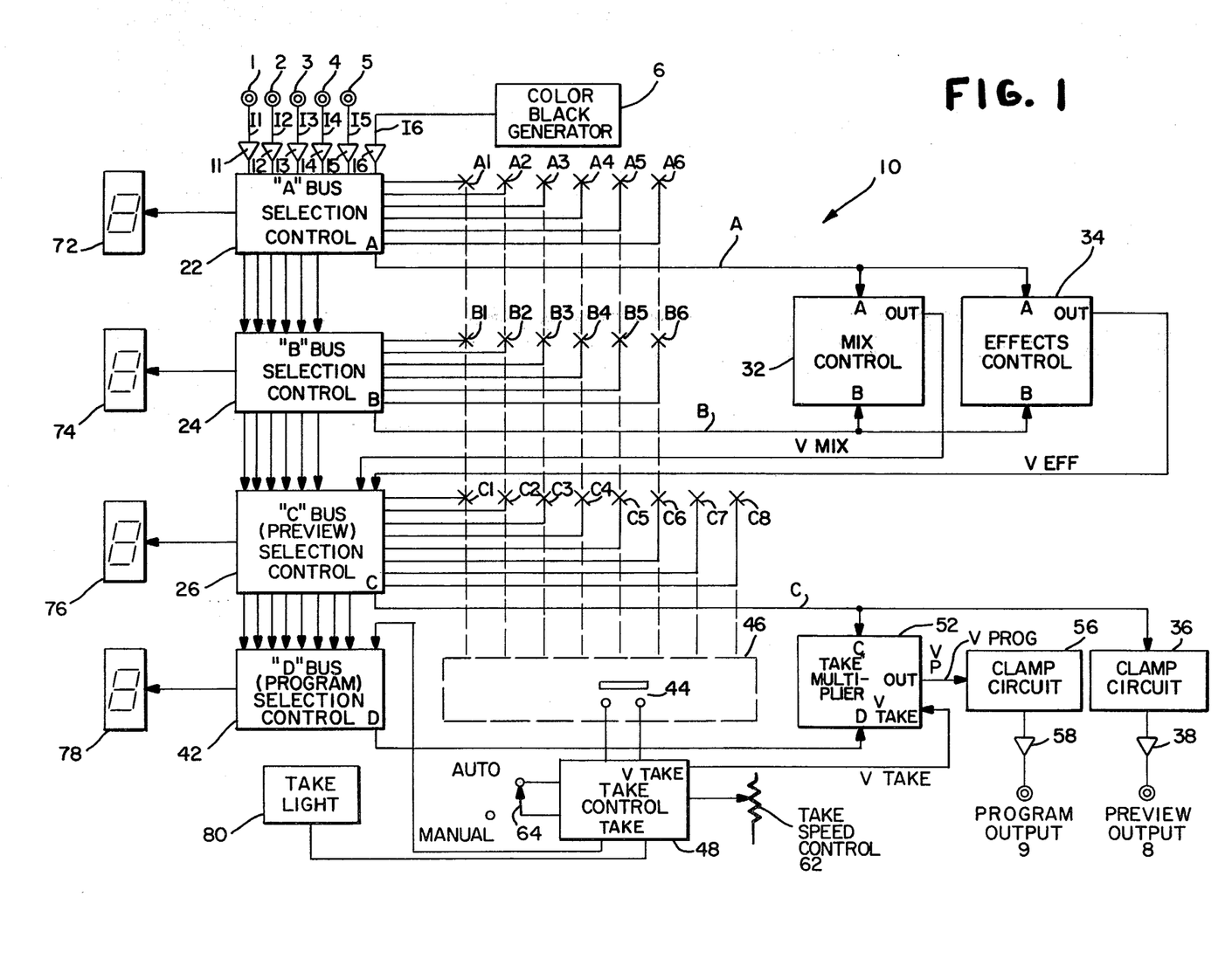
FIG. 1 is a partially schematic, partially block diagrammatic illustration of the basic components of a video switching system embodying the invention.

Referring now to the drawing, and initially to FIG. 1 thereof, there is shown a generalized block diagram of a video switching system 10 embodying the invention. The system 10 includes a plurality of input terminals, 1 through 5, which receive input video signals I1 through I5, respectively, from a corresponding plurality of remote video signal sources (not shown). The video signal sources may comprise video pick-up cameras which separately view a scene or scenes to be televised or one or more video recorders which transmit an input video signal corresponding to a previously recorded scene. The system 10 also includes a pair of output terminals 8 and 9.

Broadly stated, the purpose of the system 10 is to enable a user, typically a television program director in a television broadcast or recording studio, to select and control the particular input signals or combinations of input signals I1 through I5 that are routed to the output terminals 8 and 9 at any given point in time. As indicated in FIG. 1, the output terminal 8 is a preview output and is adapted for connection to a preview video monitor (not shown) in the studio that enables the program director to view the selected video scenes prior to presenting the scenes to the program. The output terminal 9 is a program output that carries the video signals actually presented to the program and that is adapted for connection to television broadcasting apparatus in the case of "live" television program or to television recording apparatus in the case of a "prerecorded" program. The program output terminal 9 is also typically connected to a second video monitor (not shown)

in the studio that enables the program director to view the selected scenes as they appear on the program.

Additional input video signals, such as the input signal I6, may be generated internally of the system 10. The input signal I6 may, for example, correspond to a video scene of solid color black that is generated by a color black generator 6 and that may be selected by the program director in the same way that the other input signals I1 through I5 are selected. The input signals I1 through I5 from the various remote video signal sources may be color or monochromatic, composite or non-composite video signals. Each of the input signals I1 through I6 may be synchronized for application to the system 10 using known video synchronization techniques which may involve the use of a sync signal generator (not shown) mounted either internally or externally of the system 10.

In the system 10, each input signal I1 through I6 is coupled through an associated video input amplifier stage 11 through 16, respectively, to an "A" bus selection control unit 22. The unit 22 is controlled by a group of selection switches A1 through A6. Depending upon the particular one of the switches A1 through A6 that is depressed, the unit 22 will selectively couple one of the six input signals to a "A" output bus extending from the unit 22. Thus, for example, if selection switch A1 is depressed, the unit 22 couples the input I1 to the "A" bus; if the selection switch A2 is depressed, the unit 22 couples the input I2 to the "A" bus, and so on.

The switches A1 through A6 are preferably momentary type switches that are controlled by separate pushbuttons mounted, typically on a front panel portion of the system 10, so as to be readily accessible to the program director.

Each input signal I1 through I6 is also coupled from the "A" bus selection control unit 22 to a "B" bus selection control unit 24 and, from the "B" bus selection control unit 24, to a "C" bus selection control unit 26. The "B" bus selection control unit 24 is illustratively identical to the unit 22. The unit 24 is controlled by a group of momentary pushbutton type switches B1 through B6 which enables any one of the inputs I1 through I6 to be selectively coupled to a "B" output bus.

The "A" and "B" bus control units 22 and 24 are included so as to enable the program director to combine input video signals and produce either mixes or effects. The director can, for example, select input signal I2 on the "A" bus by depressing selection switch A2, input signal I5 on the "B" bus by depressing selection switch B5, and couple these two signals to the "A" and "B" inputs of a mix control unit 32. The mix control unit 32 mixes the two signals I2 and I5 and produces an output VMIX that is coupled as an additional input the "C" bus selection control unit 26. The unit 32 typically includes front panel mounted controls (not shown) that enable the director manually to adjust the relative proportions of the "A" and "B" bus signals in the VMIX output continuously from an all "A" bus signal condition to an all "B" bus signal condition. The video scene corresponding to the VMIX output can thus be faded between that corresponding to the "A" bus signal alone and that corresponding to the "B" bus signal alone or frozen anywhere therebetween so that the individual video images corresponding to the two input signals are both visible in the scene at the same time.

Similarly, the director can select a first input signal on the "A" bus, a second input signal on the "B" bus and couple the two signals to the "A" and "B" inputs of an effects control unit 34. The effects control unit 34 controllably switches back and forth between the "A" and "B" bus signals to produce an output VEFF that is also coupled as an input to the "C" bus selection control unit 26. The video scene corresponding to the VEFF output is thus split, with a portion of the scene including the video image corresponding to the "A" bus signal alone and the remainder of the scene including the video image corresponding to the "B" bus signal alone. Front panel controls (not shown) are typically included in the unit 34 that enable the selection of the particular input signal switching pattern that is used by the unit 34. Different switching patterns result in different splits of the video scene and these splits generally include diagonal splits, corner inserts and inserts of various shapes (e.g., circular and square) in the center of the scene. Controls may also be included in the unit 34 that enable the director to move the center inserts around in the scene, to change the eccentricity of the center inserts (e.g., from a circle to an ellipse and from a square to a rectangle), and to change the angle of the diagonal splits.

Units like the mix control unit 32 and effects control unit 34 are known in the art and conventionally used in prior video switching systems.

The "C" selection control unit 26 is like the "A" and "B" bus selection control units 22 and 24 except for the fact that it is controlled by a group of eight momentary pushbutton selection switches C1 through C8, rather than six as in the case of the other units. In the embodiment of FIG. 1, depression of switches C1 through C5 causes the unit 26 to couple input signals I1 through I5, respectively, to a "C" output bus. Depression of switches C6 and C7 causes the unit 26 to couple the VMIX and VEFF signals, respectively, to the "C" output bus, and depression of switch C8 causes the unit 26 to couple input signal I6 (i.e., color black) to the "C" output bus.

As indicated in FIG. 1, the "C" bus selection unit 26 is used for preview selection purposes. The "C" bus is connected through a conventional clamping, or D.C. restoration circuit 36 and video output amplifier stage 38 to the preview output 8 of the system 10. The program director can thus individually select the I1–I6, VMIX and VEFF signals for transmission to the preview monitor in the studio simply by depressing the appropriate one of the switches C1–C8. The director can also edit and adjust the selected scenes while they are being displayed on the preview monitor using conventional adjustment controls (not shown).

The signals I1–I6, VMIX and VEFF signals are coupled from the "C" bus selection control unit 26 as inputs to a "D" bus selection control unit 42 which is used for program selection purposes. Like the units 22, 24 and 26 previously described, the unit 42 can selectively couple any of its inputs to a "D" output bus. However, unlike the units 22, 24 and 26, the unit 42 is not controlled by a group of separate selection switches and does not directly couple any of its inputs to the "D" output bus upon activation of any such switch. Rather, when it is desired to transmit a selected signal to the program output 9 of the system 10, the signal must first be selected on the "C" or preview bus by depression of the appropriate switch C1–C8. As a result, each scene that is routed to the program output 9 must first be routed to the preview output 8. The program director is thus forced to preview all scenes, even if for relatively short periods of time, prior to presenting the scenes to the actual program. The system 10 thus minimizes the possibility that scenes that are undesirable for one reason or another will be switched directly to the program without the benefit of editing or adjustment by the director.

Once a particular signal is selected for previewing on the "C" bus by activation of one of the switches C1–C8, that signal can be transmitted to the program by activation of a take switch 44. The take switch 44 is illustratively also a momentary switch but is activated by depression of an elongated take bar 46, shown in phantom in FIG. 1, and preferably positioned directly beneath the preview selection switches C1–C8. Depression of the take switch 44 activates a take control unit 48. The take control unit 48, in turn, generates a pair of control signals, VTAKE and TAKE, which are applied as controlling inputs to a take multiplier unit 52 and the "D" bus selection control unit 42, respectively.

The take multiplier unit 52 is adapted to receive the signals on the "C" and "D" buses and generate an output VPROG that is a mixture of the two and that is coupled through another clamping circuit 56 and video output amplifier stage 58 to the program output 9 of the system 10. The unit 52, under the control of the VTAKE signal, automatically adjusts the mixture so that the relative proportion of the "D" bus signal is decreased and the relative proportion of the "C" bus signal is increased in the output VPROG. The new selected scene is thus automatically faded into the program, while the old scene, if any, is automatically faded out of the program. The effect of the program change on the viewer is thereby softened.

When the level of the "C" bus signal in the output VPROG reaches a maximum (and the level of the "D" bus signal reaches zero), the take control unit 48 is adapted to transmit the TAKE signal to the "D" bus selection control unit 42. The unit 42, in response to the TAKE signal, then automatically couples the particular input signal that was previously selected for previewing on the "C" bus to the "D" output bus. The new input signal alone is thus routed on the "D" bus to the take multiplier unit 52 from which it is coupled to the program output 9 as VPROG. Because the level of the "C" bus signal on the program output 9 has already been built up to a maximum, the switching to that signal on the "D" bus is not visible in the program. After the switch is accomplished, the "C" bus is again available to the program director for the selection and preview of other scenes.

The take control unit 48 is provided with a take speed control 62 that can be adjusted to vary the VTAKE signal and, in turn, vary the rate at which the take multiplier unit 52 effects the transition from the "D" bus signal to the "C" bus signal in the VPROG output during a take operation. The control 62 may, as indicated, take the form of a variable resistance that can be adjusted by the director prior to depression of the take switch 44. The control 62 preferably enables the program transition period to be selected anywhere from that corresponding to about three video frames (about 0.1 second) to that corresponding to several hundred video frames (about 30 seconds). Even a relatively fast program transition of this type (e.g., accomplished in a few video frames) is generally found more desirable than an abrupt, discontinuous program switch of the type performed by prior video switching systems.

The take control unit 48 also preferably includes an automatic-to-manual mode switch 64. With the switch 64 in the "auto" position indicated in FIG. 1, the take control unit 48 operates automatically to advance the transition from the "D" bus signal to the "C" bus signal that is effected by the take multiplier unit 52 in the manner described hereinabove. If, however, the switch 64 is switched to its "manual" position, the take control unit 48 advances the transition only during the time period in which the take switch 44 is held in a depressed position. This enables the program director manually to control the program transition or to freeze the transition at some point short of completion if he so desires.

For the director's convenience, each of the selection control units 22, 24, 26 and 42 is adapted to control a digital display unit 72, 74, 76 and 78, respectively, that displays a digital number corresponding to the particular input signal (i.e., I1–I6 in the case of units 22 and 24 and I1–I6 VMIX or VEFF in the case of units 26 and 42) that appears on the output bus of that unit. The take control unit 48 is also preferably adapted to control a take light 80 that provides the program director with an indication of the fact that a take operation is in progress. The light 80 is illuminated upon depression of the take switch 44 and goes out simultaneously with the transmission of the TAKE signal by the unit 48.

Figure 2:
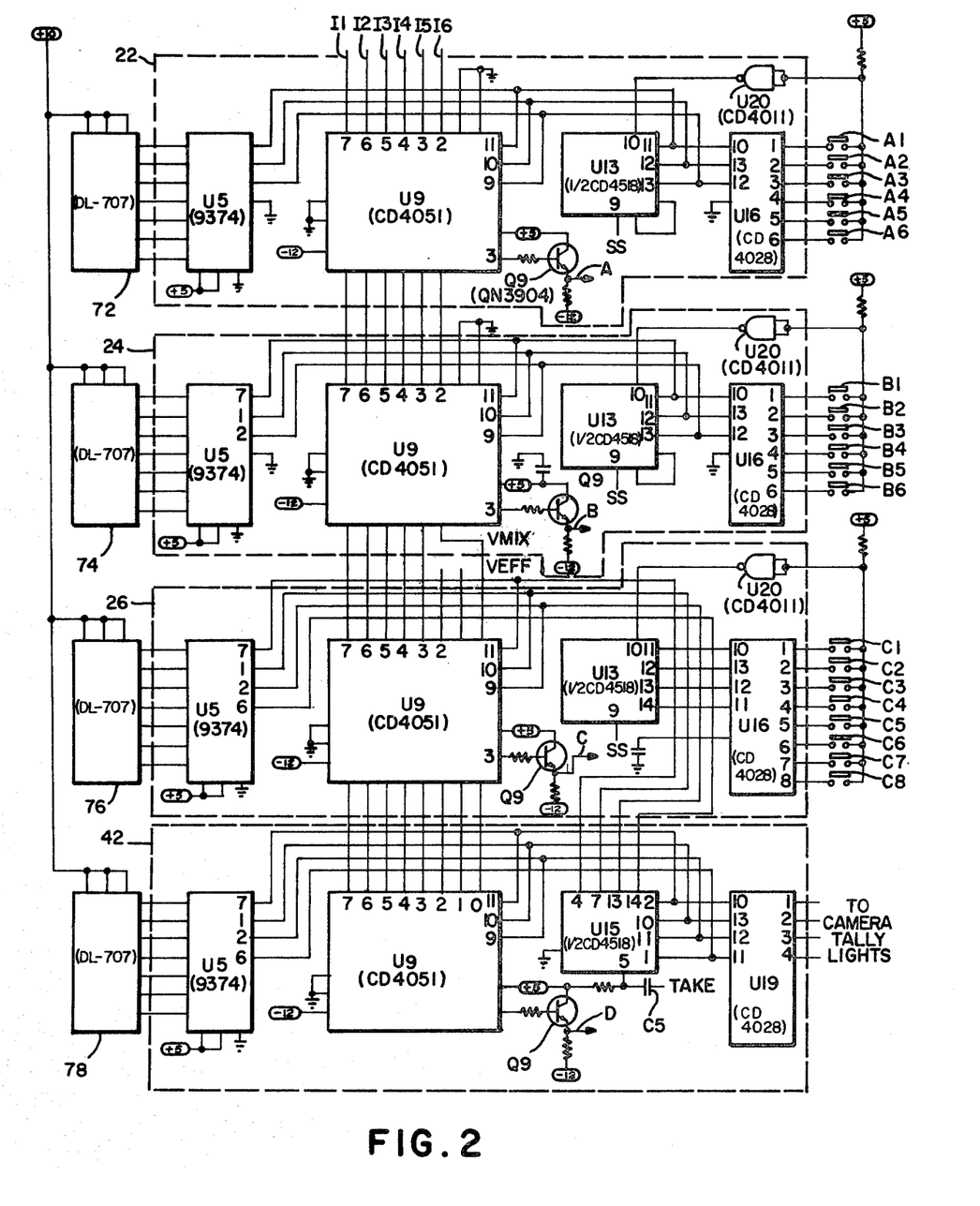
FIG. 2 is a schematic illustration showing further details of the bus selection control units, selection switches and selection display units shown in the embodiment of FIG. 1.

FIG. 2 of the drawing shows further illustrative details of the selection control units 22, 24, 26 and 42, selection switches A1–A6, B1–B6, C1–C8 and selection display units 72, 74, 76 and 78 of FIG. 1. As indicated in FIG. 2, each of the selection units 22, 24, 26 and 42 is made up of commercially available electronic components, the type designation of which is indicated in parentheses in FIG. 2 for each such component. The construction and operation of selection unit 22 is typical of all four of the units and is described in detail below.

The unit 22 has six video inputs, I1 through I6, which are applied to pins 7, 6, 5, 4, 3 and 2, respectively, of an 8-input, 1-output data selector U9 (type designation CD4051). The selector U9 selects one of these video inputs according to the binary code appearing on its pin 9, 10 and 11 inputs and routes that selected video input to its output pin 3.

The selection switches A1 through A6 are coupled to a binary coded decimal (BCD) decoder U16 (type designation CD4028). Each of the decoder U16 output pins 1–6 is normally high, but goes low when its binary input corresponds to that output. Upon depression of a particular switch A1–A6, the normally low output of decoder U16 is coupled to an inverter U20 which enables counting of a counter/latch U13 (type designation CD4518) by way of its count enable input pin 10. Counter/latch U13 will now count until a binary code corresponding to the number of the depressed switch is inputed to decoder U16. This binary code is also coupled to input pins 9, 10 and 11 of selector U9 and to input pins 7, 1 and 2, respectively, of a BCD-to-seven segment decoder-driver U5 (type designation 9374) that drives the seven segment display unit 72 (type designation DL-707).

Assume, by way of example, that selection switch A5 is depressed. When A5 is pushed, the inputs to inverter U20 go low and its output, which is connected to the enable input pin 10 of counter/latch U13, goes high. Counter/latch U13 is thereby enabled and will commence counting clock pulses SS received at its clock input pin 9. The clock pulses SS are generated internally of the system 10 and are synchronized to the input video signals so that they occur only during the vertical drive time portion of the signals. Thus, even if the switch A5 were pushed during the active raster portion of a signal, the counter/latch U13 does not commence counting until vertical retrace is commenced.

Each clock pulse SS advances counter/latch U13 by one count. When a count of "5" (corresponding to the depressed switch A5) is reached, decoder U16 produces a high on its pin 5 which results in a high on the inputs to inverter U20 and a low on the enable input pin 10 of counter/latch U13. The counter/latch U13 is thereby disabled and locks on the count of "5". The binary code for the number "5" (i.e., 101) is thus stored in the counter/latch U13. This code is coupled to input pins 9, 10 and 11 of selector U9 which routes the input signal I5 to its output pin 3. Input signal I5 is, in turn, coupled through transistor Q9 to the "A" output bus of the unit 22.

The binary code for the number "5" is also coupled to decoder-driver U5 which causes display unit 72 to display the digit "5".

The individual components and operation of the selection units 24 and 26 are essentially identical to those described above for the unit 22 and are thus referenced by identical reference characters in FIG. 2. The unit 26 differs from the unit 22 only in the fact that the data selector U9 for the unit 26 has eight, rather than six, inputs so as to enable the selection of the VMIX and VEFF signals in addition to the I1-I6 signals. The decoder U16 in the unit 26 is also controlled by the eight C1-C8 switches rather than six.

The program selection unit 42 is somewhat different. The unit 42 includes a latch U15 (type designation CD4042) which stores the binary code for the video input that is switched to the "D" bus. As indicated in FIG. 2, the TAKE signal from the take control unit 48 of FIG. 1 is applied through capacitor C5 to input pin 5 of latch U15. Pins 2, 10, 11 and 1 of the latch U15 connect to pins 11, 12, 13 and 14, respectively, of the counter/latch U13 in the preview selection unit 26. Upon receiving the TAKE signal, the binary code stored in the counter/latch U13 in the preview selection unit 26 is transferred to latch U15. This binary code is coupled from the latch U15 to a data selector U9 and decoder-driver U5 in the unit 42 which are illustratively identical to the corresponding components in the units 22, 24 and 26. The data selector U9 in the unit 42 thus routes the input corresponding to the binary code stored in the latch U15 to its output pin 3 and through transistor Q9 to the "D" output bus. The decoder-driver U5 in the unit 42 causes the display unit 78 to display the digit corresponding to the selected input.

The unit 42 also includes a BCD-to-octal decoder U19 which is of the same type designation as the decoders U16 in the units 22, 24, 26 but which is not used for selection purposes. The decoder U19 connects to the latch U15 and generates an octal output on its output pins 1-4 which may be used to selectively energize tally lights for remote pick-up cameras used with the system 10 so as to provide an indication as to when the video input signal from a particular camera is being used in the program.

Figure 3:
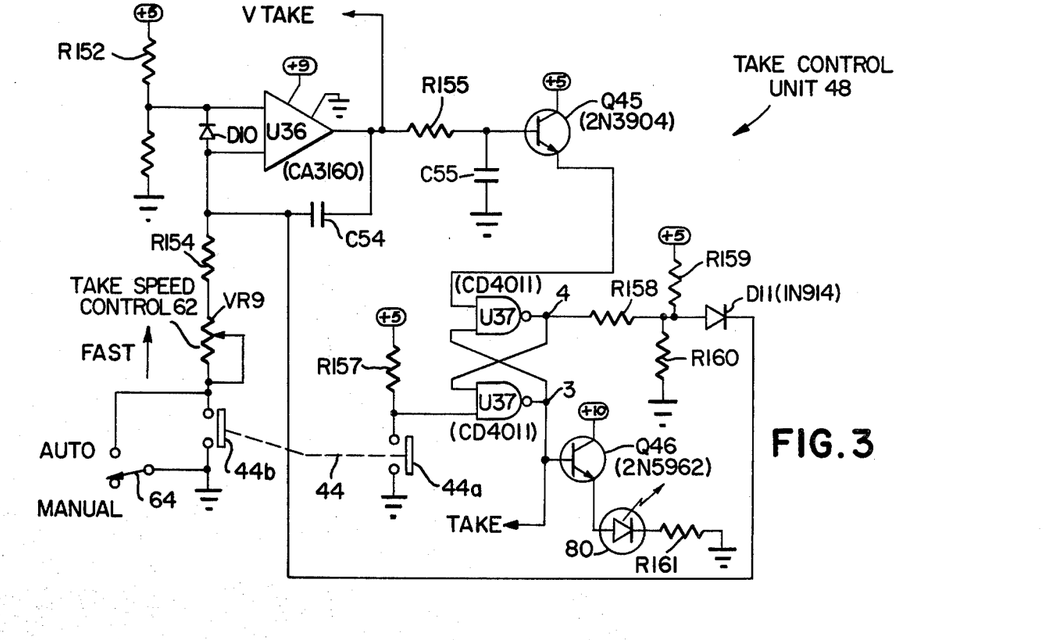
FIG. 3 is a schematic illustration showing further details of the take control unit shown in the embodiment of FIG. 1.

FIG. 3 shows further illustrative details of the take control unit 48 of FIG. 1. As noted above, the unit 48 is adapted to generate the two control signals VTAKE and TAKE. It is assumed initially that the switch 64 is in the "AUTO" position so that the unit 48 is in its automatic mode of operation. As indicated in FIG. 3, the take switch 44 actually comprises a pair of switches 44a and 44b that are ganged together so that each closes when the take bar 46 (FIG. 1) is depressed. When the take switch 44a is closed, it sets a flip-flop U37 and output pin 3 of the flip-flop U37 goes from low to high. Pin 3 of flip-flop U37 connects through transitor Q46 to take light 80 which, as shown, is in the form of a light emitting diode. The light 80 is thus energized to signify that a take operation has been commenced. The TAKE signal is coupled from pin 3 of the flip-flop U37. The TAKE signal thus also goes from low to high upon the closing of take switch 44a.

In the "AUTO" position, switch 64 shorts take switch 44b to provide a current path to ground through resistor VR9. The non-inverting input of an integrator U36 connects to voltage dividing resistors R152 and R153 and is thereby biased at a fixed DC voltage (e.g., 0.1 volt). This results in a fixed voltage (e.g., 0.1 volt), across VR9 which, in turn, results in a charging current for capacitor C54 equal to the fixed voltage divided by the resistance of VR9. The output of integrator U36 will therefore increase from ground at a rate determined by the resistance of VR9. This increase will continue until transistor Q45 is turned off (e.g., at +5 volts). The collector output of transistor Q45 will then fall to zero volts and reset flip-flop U37. The TAKE signal will, in turn, go low and the falling edge of the TAKE signal will activate the latch U15 (FIG. 2) in the program bus selection control unit 42 to cause the input signal selected on the "C" bus to be switched to the "D" bus. The take light 80 will also be de-energized to signify the completion of the take operation.

The VTAKE signal is coupled from the output of integrator U36. The VTAKE signal thus rises from zero volts upon the closing of take switch 44a at a rate determined by the resistance of VR9 and, therefore, the setting of the take speed control 62. When the transistor Q45 turns off, and flip-flop U37 is reset, output pin 4 of the flip-flop U37 goes high and the capacitor C54 will discharge through diode D11. The VTAKE signal thus rapidly falls back to zero volts so as to be ready for the next take operation.

Figure 4:
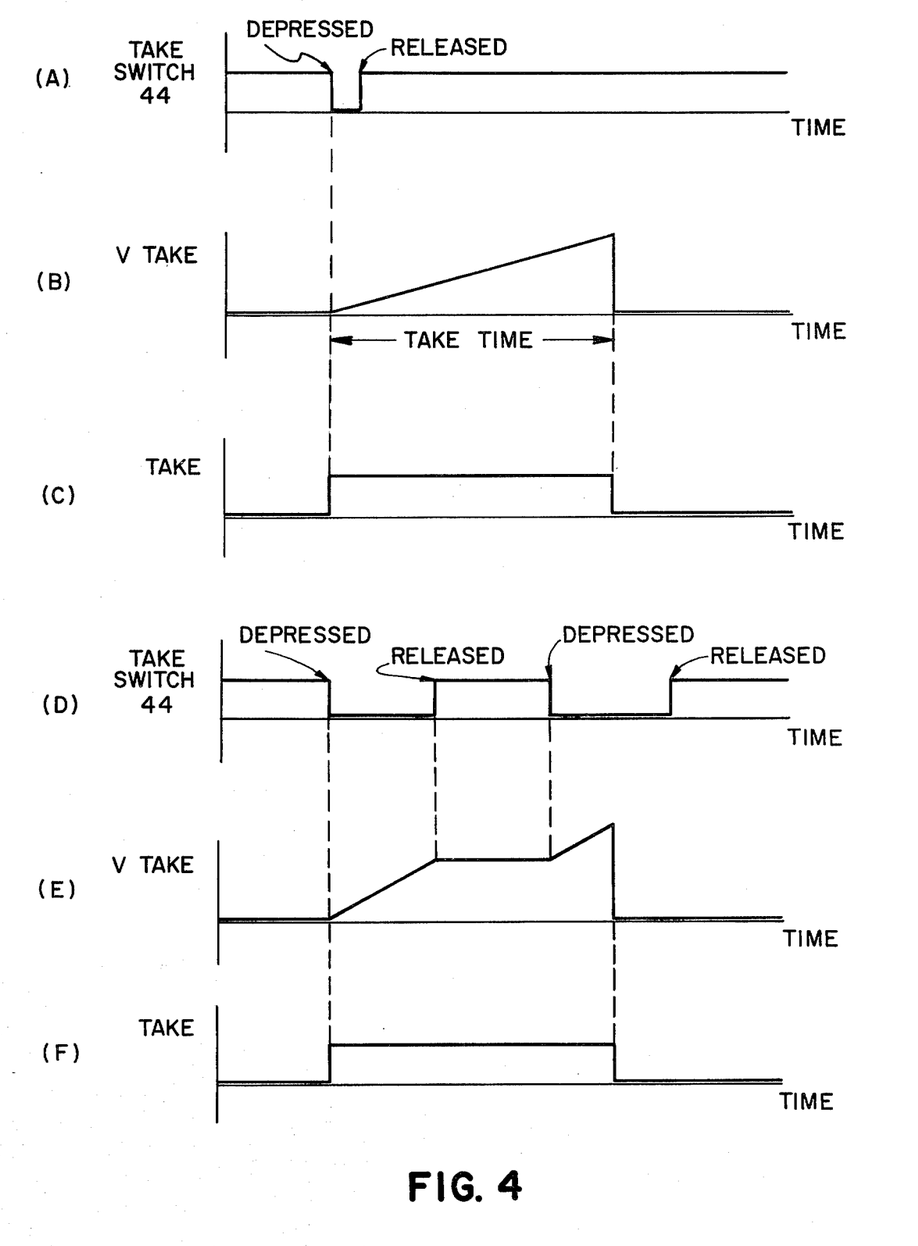

FIGS. 4A, 4B and 4C of the drawing illustrate the form of the VTAKE and TAKE signals generated by the unit 48 in its automatic mode of operation and the time relationship between those signals and the depression of the take switch 44. If the setting of the take speed control 62 is changed, the slope of the rising portion of the VTAKE signal and the time required for the take operation to go to completion will also change.

If the switch 64 of FIG. 3 is moved to its "manual" position, the switch 44b is no longer shorted thereby and charging current is supplied to the capacitor C54 only during the time period in which the switch 44b is closed. The magnitude of the VTAKE signal will thus rise only while the take switch 44 is held in a depressed position. As a result, the take operation can be frozen short of completion by releasing the take switch 44. The form of the VTAKE and TAKE signals generated by the unit 48 in such a manual mode of operation are illustrated in FIGS. 4D, 4E and 4F of the drawing.

Figure 5:
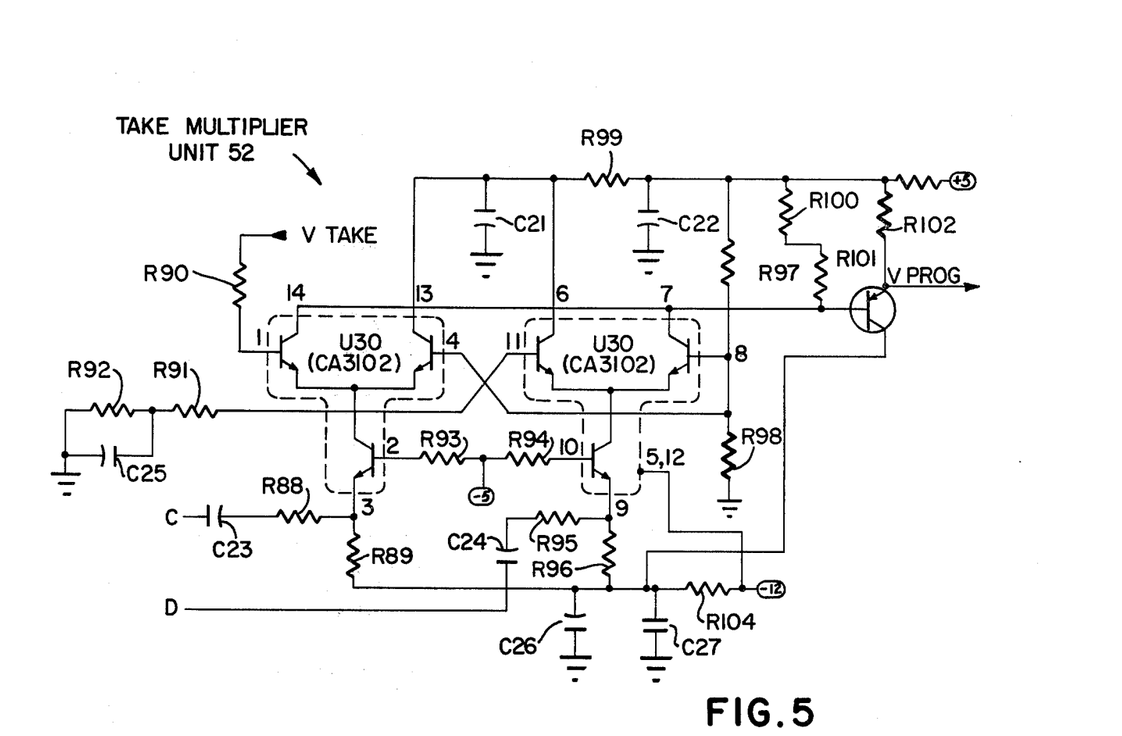
FIG. 5 is a schematic illustration showing further details of the take multiplier unit shown in the embodiment of FIG. 1.

FIG. 5 illustrates further details of the take multiplier unit 52 of FIG. 1. At the heart of the unit 52 is a dual differential amplifier U30 (type designation CA3102) which is adapted to served as a Gilbert cell or transconductance multiplier for the "C" and "D" bus signals. The "C" and "D" bus signals are applied to input pins 3 and 9, respectively, of multiplier U30 while the VTAKE signal is applied to input pin 1 thereof. When VTAKE is at zero volts, the multiplier U30 passes the signal at its pin 9 input directly to its pin 7 output. Thus, the "D" or program bus signal alone is normally passed by the multiplier U30. When VTAKE is at +5 volts, the multiplier U30 passes the signal at its pin 3 input alone and, therefore, only the "C" bus signal appears at its output. At intermediate VTAKE voltages, the output from multiplier U30 will be a mixture of its two inputs. The relative proportions of the "C" and "D" bus signals in the output of multiplier U30 is determined by the voltage of the VTAKE signal. The output of multiplier U30 is coupled through transistor Q25 to provide the VPROG output of the unit 52.

The foregoing description has been directed to a specific illustrative embodiment of the invention. Clearly, numerous modifications may be made to the embodiment described by those skilled in the art without departing of the intended scope of the invention, as defined by the appended claims.

What we claim as new and desire to secure by Letters Patent is:

1. A switching system for video signals comprising:
  A. a plurality of inputs for receiving a corresponding plurality of input video signals, including a current video signal;
  B. a preview output and a program output, said preview output being adapted for connection to a preview video monitor;
  C. preview selection means for selecting one of a plurality of inputs and for placing the input video signal associated with the selected input onto a preview bus, said preview bus carrying the selected signal to said preview output;
  D. program connection means for connecting the input associated with the current video signal to a program bus;
  E. a take switch;
  F. take control means including a first input connected to said preview bus, a second input connected to said program bus, an output connected to said program output, said take control means generating an output video signal corresponding to the video signal on the program bus prior to activation of said take switch, and, after activation of the take switch, generating an output video signal corresponding to the video signal on the preview bus, the program connection means being responsive to said take control means to connect the input associated with the preview bus video signal to the program bus, the take control means thereafter generating an output signal corresponding to the program bus video signal.

2. A video switching system as defined in claim 1 wherein the preview selection means includes:
  i. at least one separate selection switch for each of the input signals,
  ii. means responsive to the activation of a selected one of said selection switches for switching the corresponding one of the input signals to said preview bus for previewing on the preview monitor, and
  iii. means for generating a code signal that identifies said one of the input signals selected for previewing; and said program selection means includes means responsive to the preview selection means code signal and to the take control means for connecting the program bus to the input associated with the video signal on the preview bus.

3. A video switching system as recited in claim 2 further including
  G. first and second additional buses for carrying selected ones of the input signals,
  H. selection means for said first additional bus including
    i. at least one separate selection switch for each of the input signals, and
    ii. means responsive to the activation of a selected one of said first bus selection switches for switching the corresponding one of the input signals to said first bus, and
  I. selection means for said second additional bus including
    i. at least one separate selection switch for each of the input signals, and
    ii. means responsive to the activation of a selected one of said second bus selection switches for switching the corresponding one of the input signals to said second bus.

4. A video switching system as recited in claim 3 further including
  J. input signal mixing means including
    i. a first input connected to said first bus,
    ii. a second input connected to said second bus,
    iii. means for generating an output video signal that is a mixture of the input signal selected on said first bus and the input signal selected on said second bus, and
    iv. manual control means for varying the relative proportion of the first bus input signal and the second bus input signal in said output video signal.

5. A video switching system as recited in claim 4 in which said preview selection means includes an additional selection switch that, when activated, causes the output video signal from said input signal mixing means to be switched to said preview bus for previewing.

6. A video switching system as recited in claim 3 further including
  K. input signal effects generating means including
    i. a first input connected to said first bus,
    ii. a second input connected to said second bus,
    iii. means for controllably switching between the input signal on said first bus and the input signal on said second bus so as to generate an output video signal corresponding to a video scene in which video images corresponding to said first bus input signal and said second bus input signal are present simultaneously in different portions of the scene, and
    iv. manual control means for controlling the switching performed between said first bus input signal and said second bus input signal so as to vary the size and the shape of said different portions of the scene.

7. A video switching system as recited in claim 6 in which said preview selection means includes an additional selection switch that, when activated, causes the output video signal from said input signal effects generating means to be switched to said preview bus for previewing.

8. A video switching system as recited in claim 2 in which both said preview selection means and said program selection means includes display means responsive to said code signal for displaying a character identifying said one of the input signals that has been switched to said preview bus and to said program bus, respectively.

9. A video switching system as recited in claim 3 in which both said first and second selection means includes display means for displaying a character identifying said one of the input signals that has been switched to said first bus and to said second bus, respectively.

10. A video switching system as defind in claim 1 wherein said take control means further includes a take speed control responsive to the actuation of said take switch for generating a take signal over a preselected time interval such that the level of the preview bus video signal is increased during the time interval and the level of the program bus video signal is decreased during the time interval, whereby a gradual transition of the program output is effected from the program bus video signal to the preview bus video signal during the time interval.

11. A video switching system as defined in claim 10 wherein said take control means generates a further signal in response to the end of said take signal, said program connection means being responsive to said further signal to effect the connection of the preview bus video signal input to the program bus.

12. A video switching system as recited in claim 1 in which said take control means comprises:
   i. take control signal generating means for generating, in response to the activation of said take switch, a first and a second control signal and
   ii. take multiplier means for receiving said preview bus input signal, said program bus input signal and said first control signal, for generating said mixed output signal and for increasing the level of said preview bus input signal and decreasing the level of said program bus input signal in said mixed output signal responsive to said first control signal; and
in which said switching means is responsive to said second control signal for switching said preview bus input signal to said program bus.

13. A video switching system as recited in claim 5 in which said take control signal generating means comprises
   i. means for generating said first control signal having a magnitude that, upon activation of said take switch, gradually changes from an initial value to a predetermined different value and then returns to said initial value, and
   ii. means for generating said second control signal having a magnitude that abruptly changes in response to return of said first control signal to its said initial value.

14. A video switching system as recited in claim 6 in which said take multiplier means increases the level of said preview bus input signal and decreases the level of said program bus input signal in said mixed output signal in proportion to the change in the magnitude of said first control signal.

15. A video switching system as recited in claim 6 in which said switching means switches the input signal on said preview bus to said program bus in response to the change in the magnitude of said second control signal.

16. A video switching system as recited in claim 6 in which said take control signal generating means further includes means for adjusting the time required for the magnitude of said first control signal to reach said predetermined different value so as thereby to adjust the rate at which said transition is effected.

17. A switching system for video signals comprising:
   A. a plurality of inputs for receiving a corresponding plurality of input video signals, including a current video signal;
   B. a preview output and a program output, said preview output being adapted for connection to a preview video monitor;
   C. preview selection means for selecting one of a plurality of inputs and for placing the input video signal associated with the selected input onto a preview bus, said preview bus carrying the selected signal to said preview output;
   D. program connection means for connecting the input associated with the current video signal to a program bus;
   E. a take switch;
   F. take means including:
      i. first means including a first input connected to said preview bus, a second input connected to said program bus, and an output connected to said program output, and
      ii. second means responsive to actuation of said take switch for generating take signal;
said first means including means for generating an output video signal that is the input video signal on the program bus prior to actuation of said take switch, and after actuation of the take switch, is responsive to said take signal for generating a mixture of the input signal on the preview bus and the input signal on the program bus and for varying the output signal such that the level of the preview bus input signal is increased while the level of the program bus input signal is decreased to effect a gradual transition of the preview bus input signal to the program output.

18. A video switching system as recited in claim 17 in which said take control means further includes means for varying the rate at which said transition is effected.

19. A video switching system as recited in claim 17 in which said take control means further includes manual mode switch means for causing said take control means to advance the transition of said preview bus input signal to said program output only during the time period in which said take switch is held in an activated position, whereby the progress of said transition may be manually controlled.

20. A video switching system as recited in claim 17 further including
   F. preview bus selection means including
      i. at least one separate selection switch for each of said input signals, and
      ii. means responsive to the activation of a selected one of said selection switches for switching the corresponding one of said input signals to said preview bus.

* * * * *